(12) United States Patent
Yang et al.

(10) Patent No.: US 10,962,798 B2
(45) Date of Patent: Mar. 30, 2021

(54) ELECTRONIC PRODUCT WITH STEREOSCOPIC DISPLAY DEVICE

(71) Applicant: CheRay Co. Ltd., Hsinchu (TW)

(72) Inventors: Chun-Hsiang Yang, Hsinchu (TW); Yi-Pai Huang, Hsinchu (TW); Chih-Hung Ting, New Taipei (TW); Kai-Chieh Chang, Kaohsiung (TW); Jui-Yi Wu, Miaoli County (TW)

(73) Assignee: CheRay Co. Ltd., Hsinchu (TW)

( * ) Notice: Subject to any disclaimer, the term of this patent is extended or adjusted under 35 U.S.C. 154(b) by 134 days.

(21) Appl. No.: 16/178,544

(22) Filed: Nov. 1, 2018

(65) Prior Publication Data

US 2020/0142208 A1    May 7, 2020

(51) Int. Cl.
*G02B 30/56* (2020.01)
(52) U.S. Cl.
CPC .................................... *G02B 30/56* (2020.01)
(58) Field of Classification Search
CPC .... G02B 30/05; H04N 13/388; H04N 13/302; H04N 13/3056
See application file for complete search history.

(56) References Cited

U.S. PATENT DOCUMENTS

| | | | | |
|---|---|---|---|---|
| 2010/0253768 | A1* | 10/2010 | El-Maraghi | H04N 13/305 348/51 |
| 2015/0370079 | A1* | 12/2015 | Shin | G02B 30/27 359/463 |
| 2017/0219838 | A1* | 8/2017 | Yang | G02B 30/27 |

* cited by examiner

*Primary Examiner* — Jade R Chwasz
(74) *Attorney, Agent, or Firm* — Li & Cai Intellectual Property Office (57) ABSTRACT

An electronic product with a stereoscopic display device includes a main body and a stereoscopic display device. The main body includes a housing and a circuit unit. The circuit unit is disposed in the housing. The housing has an accommodating slot. The stereoscopic display device is disposed in the accommodating slot. The stereoscopic display device includes a flat panel display, a lens array layer and a microstructure layer. The lens array layer is disposed on a display surface of the flat panel display. The lens array layer is configured to adjust light field. The microstructure layer is disposed on the lens array layer. The microstructure layer is configured to modulate a direction of light. The stereoscopic display device is configured to display a stereo image that is floating in mid-air. Accordingly, a user can naturally see the stereo image floating in mid-air at an oblique viewing angle.

7 Claims, 13 Drawing Sheets

ELECTRONIC PRODUCT WITH STEREOSCOPIC DISPLAY DEVICE

FIELD OF THE DISCLOSURE

The present disclosure relates to an electronic product, and more particularly to an electronic product with a stereoscopic display device.

BACKGROUND OF THE DISCLOSURE

Conventional electronic products, such as notebook computers, mostly include display devices that can display planar images. Some of the display devices are stereoscopic display devices that can display stereo images. However, the conventional stereoscopic display devices mainly employ the binocular vision imaging technology. For these kinds of display devices, a user has to view a stereo image at a frontal viewing angle directly facing the image, and cannot view the stereo image at other viewing angles (i.e. an oblique viewing angle). In certain situations where the stereoscopic display devices are placed horizontally, the user will naturally be staring at the image from an oblique angle, which prevents him from seeing a stereo (i.e., 3D) image as per the conventional technology. Moreover, the conventional stereoscopic display devices provide the user with visual stimuli in only one direction, i.e., either with the image projecting out or sinking in. Therefore, the conventional stereoscopic display devices cannot provide a vivid sensation that the image is escaping from the confines of a plane of the display surface and floating in mid-air.

In this regard, the present disclosure provides an electronic product with a stereoscopic display device to overcome the aforementioned drawbacks.

SUMMARY OF THE DISCLOSURE

The main object of the present disclosure is to provide an electronic product with a stereoscopic display device that enables a user to naturally see a stereo image floating in mid-air at an oblique viewing angle.

In one aspect, the present disclosure provides an electronic product with a stereoscopic display device which includes a main body and a stereoscopic display device. The main body includes a housing and a circuit unit. The circuit unit is disposed in the housing. The housing has an accommodating slot. The stereoscopic display device is disposed in the accommodating slot of the main body. The stereoscopic display device includes a flat panel display, a lens array layer and a microstructure layer. The flat panel display has a display surface. The lens array layer is disposed on the display surface of the flat panel display. The lens array layer includes a plurality of lenses. The lens array layer is configured to adjust light field. The microstructure layer is disposed on the lens array layer. The microstructure layer includes a plurality of microstructures. The microstructure layer is configured to modulate a direction of light. The stereoscopic display device is configured to display a stereo image that is floating in mid-air.

In conclusion, the advantage of the present disclosure is that since a stereoscopic display device is integrated into an electronic product, the electronic product not only has its own function, but also has a stereo image display function. The stereoscopic display device of the present disclosure changes a frontal viewing angle of a conventional naked-eye 3D stereoscopic display device into an oblique viewing angle, and enables a user to see a stereo image at the oblique viewing angle. Moreover, the stereo image is displayed above or in front of the stereoscopic display device so as to generate an effect that the stereo image is floating in mid-air.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure provides an electronic product with a stereoscopic display device. The electronic product may be a portable electronic product or other type of electronic product, such as a notebook computer, a smart speaker, a digital signage, a mobile phone, a game machine, a car dashboard, a commercial game machine, a vending machine or an automatic ticket vending machine.

First Embodiment

Figure 1:
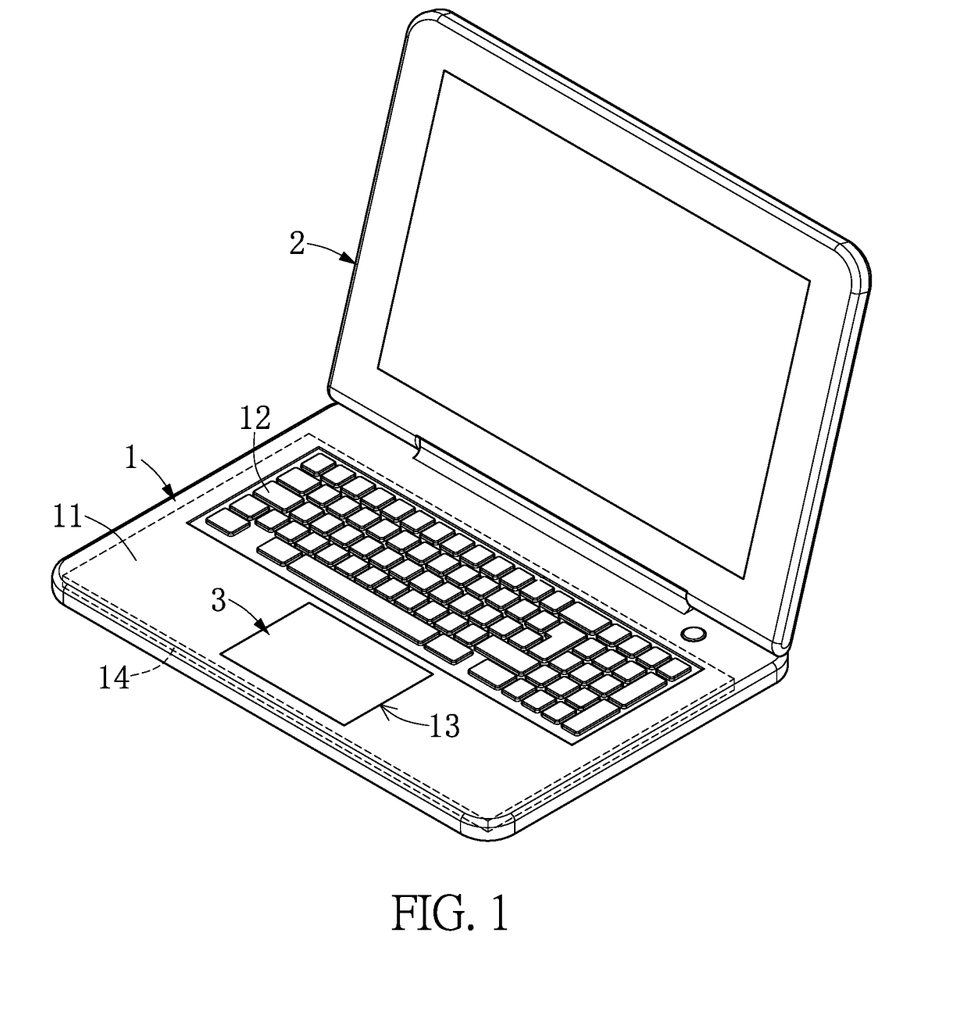
FIG. 1 is a perspective view showing an electronic product with a stereoscopic display device according to a first embodiment of the present disclosure.
Figure 2:
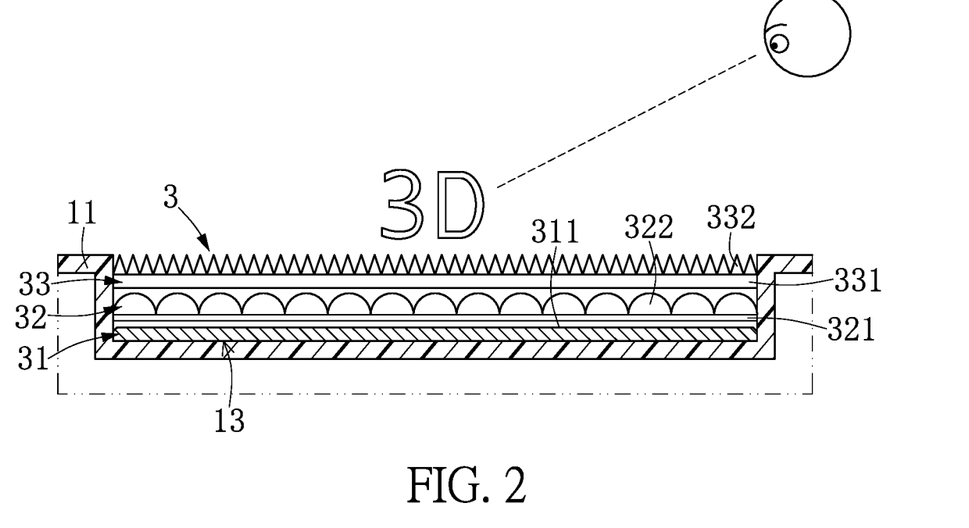
FIG. 2 is a cross-sectional view showing the partial configuration of the electronic product with the stereoscopic display device according to the first embodiment of the present disclosure.

Referring to FIG. 1 and FIG. 2, the electronic product of the present embodiment is a notebook computer. The notebook computer includes a main body 1, a screen 2 and a stereoscopic display device 3. The main body 1 is a computer host, and the main body 1 includes a housing 11 and a circuit unit 14. The circuit unit 14 is disposed in the housing 11. The circuit unit 14 is well known to the skilled artisan, and need not be reiterated herein. The notebook computer further includes an input module 12 that is disposed on the housing 11 of the main body 1. The input module 12 may be a keyboard, a touch panel or a touch screen. The screen 2 is electrically connected to the circuit unit 14 of the main body 1. The circuit unit 14 is configured to execute various programs and display the results of the execution on the screen 2. The main body 1 and the screen 2 are well known to the skilled artisan, and need not be reiterated herein.

The stereoscopic display device 3 is disposed on the main body 1. More specifically, the housing 11 of the main body 1 has an accommodating slot 13. In the present embodiment, the accommodating slot 13 is located at a top surface of the housing 11 and is located in front of the input module 12 (i.e. keyboard). The stereoscopic display device 3 is disposed in the accommodating slot 13, and a surface of the stereoscopic display device 3 is exposed outside the housing 11. Preferably, the surface of the stereoscopic display device 3 exposed outside the housing 11 is flush with (or is aligned with) the housing 11. That is, a top surface of the stereoscopic display device 3 is flush with the housing 11, but the present disclosure is not limited thereto. For example, the surface of the stereoscopic display device 3 exposed outside the housing 11 may protrude from the housing 11 or may be recessed in the housing 11. Moreover, two opposite sides of the stereoscopic display device 3 respectively abut against two opposite inner walls of the accommodating slot 13, such that the stereoscopic display device 3 can be firmly disposed in the accommodating slot 13.

The stereoscopic display device 3 includes a flat panel display 31, a lens array layer 32 and a microstructure layer 33. The flat panel display 31, the lens array layer 32, and the microstructure layer 33 are stacked sequentially from bottom to top in a three-layer structure. The flat panel display 31 has a display surface 311. The lens array layer 32 is disposed on the display surface 311 of the flat panel display 31, and the microstructure layer 33 is disposed on the lens array layer 32. The lens array layer 32 is preferably, but not limited to, in contact with the display surface 311 of the flat panel display 31. The microstructure layer 33 is preferably, but not limited to, in contact with the lens array layer 32. The stereoscopic display device 3 includes the three-layer structure. The flat panel display 31 is configured to emit light which is an integral image. The lens array layer 32 is configured to converge the light (reconstruct the integral image) so as to generate a stereo image that is floating in mid-air. The microstructure layer 33 is configured to deflect the light to an oblique angle. Accordingly, a user can see the stereo image at an oblique viewing angle which meets an ergonomic viewing angle.

The flat panel display 31 is disposed at the first layer (bottom layer) of the three-layer structure, and is configured to display an image based on an integral photography technology. The image displayed by the display surface 311 of the flat panel display 31 is redrawn based on an algorithm and the specification of the flat panel display 31. The algorithm requires no image inversion process and requires only depth information for calculation. The algorithm has steps including defining coordinates, obtaining depth information, integral image ray tracing, and reconstructing integral image. The flat panel display 31 includes an image algorithm unit including an image algorithm. The image used in the flat panel display 31 is calculated by the image algorithm. This calculation is matched to the configuration of the lens array layer 32, which predicts the various possible paths of the light, thereby calculating the relative position of the image. The image algorithm is well known to the skilled artisan, and need not be reiterated herein.

The lens array layer 32 is disposed at the second layer (middle layer) of the three-layer structure, and is configured to adjust light field. Lenses 322 (i.e. condenser lenses) of the lens array layer 32 are configured to modulate directions of lights of a 3D object, thereby allowing a user to see a stereo image at different viewing angles and to experience a stereoscopic visual effect with depth. Different lenses 322 assign different angular information to each point of the 3D object, and the lights from different lenses 322 converge into a point with depth information in mid-air. That is, for each point of the 3D object, the lights from different angles are assigned to different pixels of the lenses 322. The curvatures of the lenses 322 are determined by the materials thereof, and the curvatures of the lenses 322 as well as the combination of the lenses 322 and the flat panel display 31 determine the height, the range of viewing angle, and the clarity of the stereo image.

In the present embodiment, the lens array layer 32 is made of a material with good optical characteristics, which includes, but is not limited to, polymethylmethacrylate (PPMA), polycarbonate (PC), polyethylene (PE), glass or other light-transmissive materials. More specifically, the lens array layer 32 includes a plurality of lenses 322 and a base portion 321. The lenses 322 are respectively disposed on a surface of the base portion 321. That is, the lenses 322 are respectively disposed on the surface of the base portion 321 away from the flat panel display 31. It should be noted that the arrangement and structure of the lens array layer 32 is not limited to the features described above. The lenses 322 have focusing function. The curvatures and the materials of the lenses 322 as well as the combination of the lenses 322 and the flat panel display 31 determine the height, the range of viewing angle, and the clarity of the stereo image.

The microstructure layer 33 is disposed at the third layer (top layer) of the three-layer structure, and is configured to modulate a direction of light emitted from the flat panel display 31 and passing through the lens array layer 32. The microstructure layer 33 of the present embodiment includes a plurality of triangular-shaped microstructures 322 that can deflect the light to an oblique angle with respect to a frontal angle, so that a user can see the stereo image naturally at an oblique viewing angle, and need not see the stereo image at a frontal viewing angle.

In the present embodiment, the microstructure layer 33 is made of a material which includes, but is not limited to, polyester (PET), polypropylene (PP) or polycarbonate (PC). More specifically, the microstructure layer 33 includes a plurality of microstructures 332 and a base material 331. The microstructures 332 are respectively disposed on a surface of the base material 331. That is, the microstructures 332 are respectively disposed on the surface of the base material 331 away from the lens array layer 32. The microstructures 332 of the present embodiment are all triangular-shaped, such as isosceles triangle-shaped or right triangle-shaped. It should be noted that the arrangement and structure of the microstructure layer 33 is not limited to the features described above. Moreover, the stereoscopic display device 3 may further include a transparent plate (not shown) disposed on the microstructure layer 33 to provide a protective effect.

By virtue of the three-layer structure described above, light emitted from the flat panel display 31 can pass through the lens array layer 32 to converge into a 3D stereo image in mid-air. The microstructure layer 33 can further deflect the light to an oblique angle with respect to a frontal angle, so that a user can see the stereo image naturally at an oblique viewing angle which meets an ergonomic viewing angle.

Figure 3:
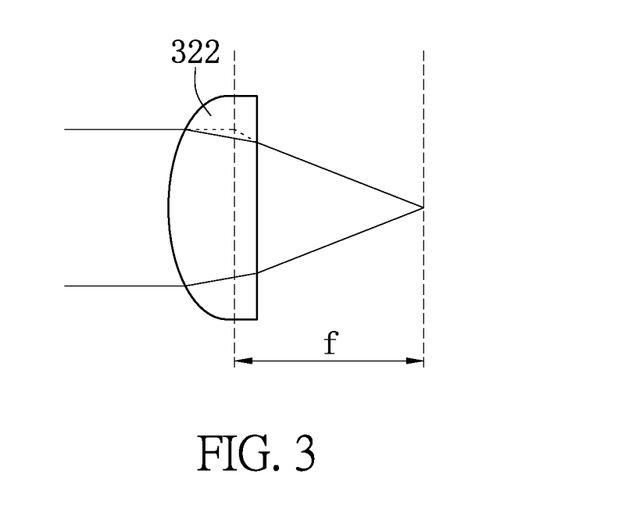
FIG. 3 is a schematic view showing a single lens which is focusing light in the stereoscopic display device according to the first embodiment of the present disclosure.

The micro-structures of the lens array layer 32 are the lenses 322 with focusing function. The specification of each lens 322 will determine the lens focusing ability according to the refractive index n value of the material. The refractive index n value of the material ranges from 1.3 to 3.0. More specifically, the transmittance of the material is greater than or equal to 70%, and the reflectance of the material is less than or equal to 25%. Each lens 322 transmits light having a wavelength ranging from 300 nm to 1100 nm. The focal length f of a single lens 322 is shown in FIG. 3. Each lens 322 conforms to the Lensmaker's equation: $1/f=(n-1)(1/R1+1/R2)$, in which R1 and R2 are respective curvature radiuses of two opposite surfaces of the lens, f is a focal length of the lens, and n is a refractive index of the lens.

Accordingly, the present embodiment provides a stereoscopic display device 3 that enables a user to see a stereo image at an oblique viewing angle. The stereoscopic display device 3 is integrated into an electronic product (i.e. a notebook computer) to enable the electronic product to have a stereo image display function.

Second Embodiment

Figure 4:
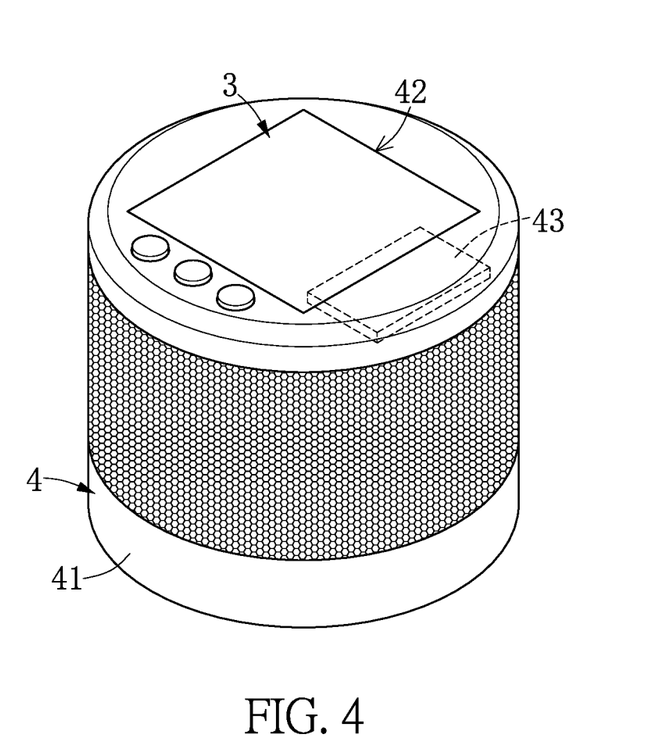
FIG. 4 is a perspective view showing an electronic product with a stereoscopic display device according to a second embodiment of the present disclosure.

Referring to FIG. 4, the electronic product of the present embodiment is a smart speaker. The smart speaker includes a main body 4 and a stereoscopic display device 3. The main body 4 is a smart speaker structure. The main body 4 includes a housing 41 and a circuit unit 43. The circuit unit 43 is disposed in the housing 41. The circuit unit 43 is well known to the skilled artisan, and need not be reiterated herein. The smart speaker structure is a speaker with a built-in artificial intelligence (AI) voice assistant and having voice input function. The smart speaker structure can be connected to a cloud computing platform via a wireless network to search large amounts of data, so that a user can get required information. For example, the smart speaker structure can broadcast weather and time to the user, the smart speaker structure can help the user order tickets and movie tickets, and the smart speaker structure can also play music and radio programs to the user. Moreover, the smart speaker structure can communicate with the user, and the smart speaker structure can help the user open other smart home appliances via the Internet of Things (JOT).

The stereoscopic display device 3 is disposed on the main body 4. More specifically, the housing 41 of the main body 4 has an accommodating slot 42. In the present embodiment, the accommodating slot 42 is located at a top surface of the housing 41. The stereoscopic display device 3 is disposed in the accommodating slot 42, and a surface of the stereoscopic display device 3 is exposed outside the housing 41. Preferably, the surface of the stereoscopic display device 3 exposed outside the housing 41 is flush with (or is aligned with) the housing 41, but the present disclosure is not limited thereto. The stereoscopic display device 3 includes a flat panel display 31, a lens array layer 32 and a microstructure layer 33 as shown in FIG. 2. The configuration and function of the stereoscopic display device 3 of the present embodiment are the same as those of the first embodiment, and will not be reiterated herein. The smart speaker of the present embodiment includes the stereoscopic display device 3 that enables a user to see a stereo image at an oblique viewing angle. The stereoscopic display device 3 is integrated into an electronic product (i.e. a smart speaker) to enable the electronic product to have a stereo image display function.

Third Embodiment

Figure 5:
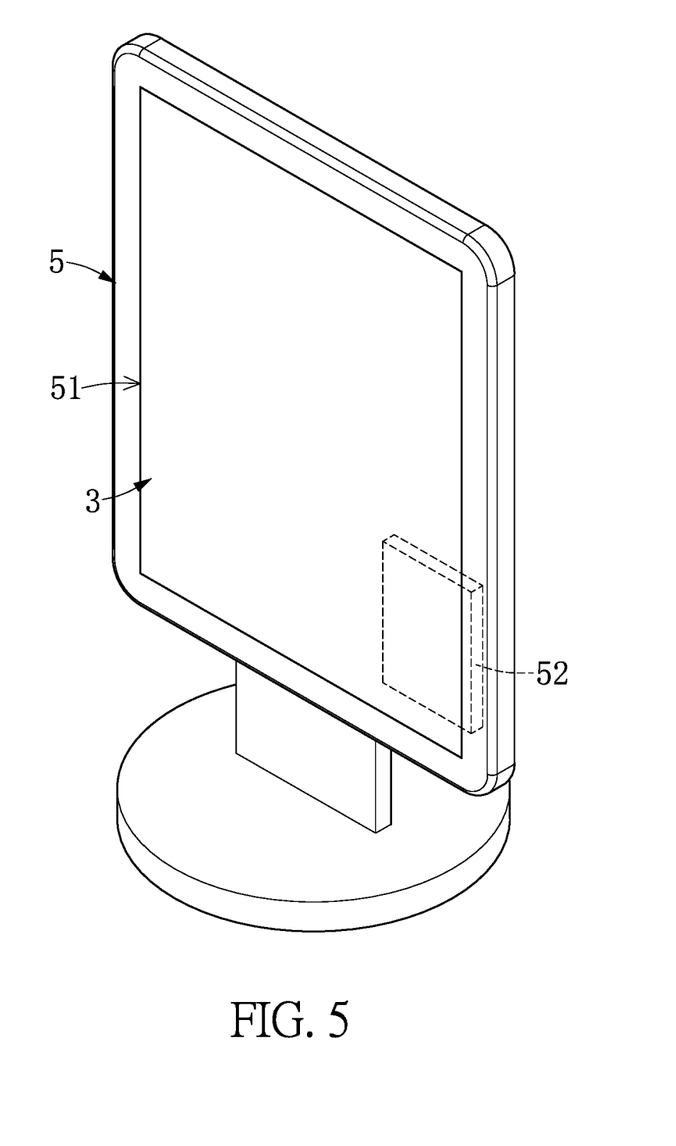
FIG. 5 is a perspective view showing an electronic product with a stereoscopic display device according to a third embodiment of the present disclosure.

Referring to FIG. 5, the electronic product of the present embodiment is a digital signage. The digital signage includes a main body 5 and a stereoscopic display device 3. The main body 5 is configured to support and fix the stereoscopic display device 3. The digital signage further includes a circuit unit 52 disposed in the main body 5. The circuit unit 52 is well known to the skilled artisan, and need not be reiterated herein.

The stereoscopic display device 3 is disposed on the main body 5. More specifically, the main body 5 has an accommodating slot 51. In the present embodiment, the accommodating slot 51 is located at a front side of the main body 5, the stereoscopic display device 3 is disposed in the accommodating slot 51, and a surface of the stereoscopic display device 3 is exposed outside the main body 5. The configuration and function of the stereoscopic display device 3 of the present embodiment are the same as those of the first embodiment, and will not be reiterated herein. The digital signage of the present embodiment includes the stereoscopic display device 3 that enables a user to see a stereo image at an oblique viewing angle. The stereoscopic display device 3 is integrated into an electronic product (i.e. a digital signage) to enable the electronic product to have a stereo image display function.

Fourth Embodiment

Figure 6:
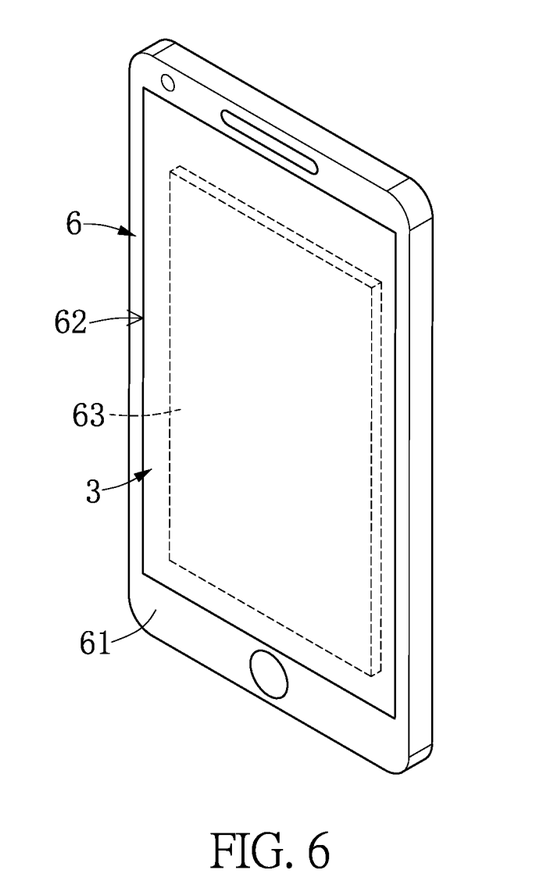
FIG. 6 is a perspective view showing an electronic product with a stereoscopic display device according to a fourth embodiment of the present disclosure.

Referring to FIG. 6, the electronic product of the present embodiment is a mobile phone. The mobile phone includes a main body 6 and a stereoscopic display device 3. The main body 6 includes a housing 61 and a circuit unit 63. The circuit unit 63 is disposed in the housing 61. The circuit unit 63 is well known to the skilled artisan, and need not be reiterated herein.

The stereoscopic display device 3 is disposed on the main body 6. More specifically, the housing 61 of the main body 6 has an accommodating slot 62. In the present embodiment, the accommodating slot 62 is located at a front side of the housing 61, the stereoscopic display device 3 is disposed in the accommodating slot 62, and a surface of the stereoscopic display device 3 is exposed outside the housing 61. The configuration and function of the stereoscopic display device 3 of the present embodiment are the same as those of the first embodiment, and will not be reiterated herein. The mobile phone of the present embodiment includes the stereoscopic display device 3 that enables a user to see a stereo image at an oblique viewing angle. The stereoscopic display device 3 is integrated into an electronic product (i.e. a mobile phone) to enable the electronic product to have a stereo image display function.

Fifth Embodiment

Figure 7:
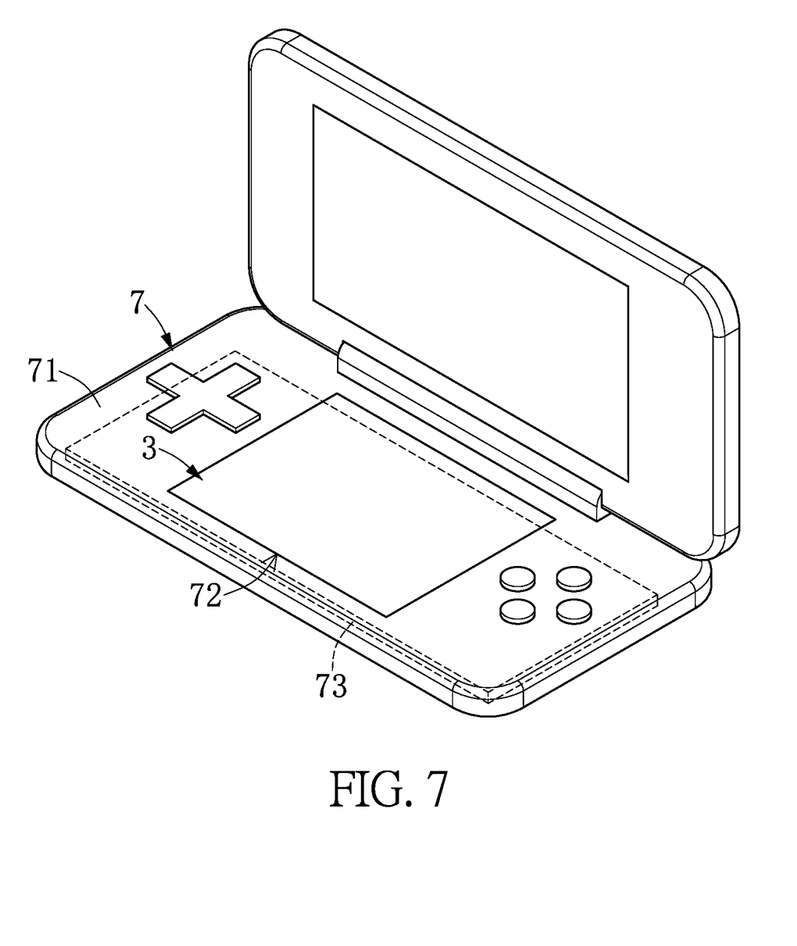
FIG. 7 is a perspective view showing an electronic product with a stereoscopic display device according to a fifth embodiment of the present disclosure.

Referring to FIG. 7, the electronic product of the present embodiment is a game machine. The game machine includes a main body 7 and a stereoscopic display device 3. The main body 7 includes a housing 71 and a circuit unit 73. The circuit unit 73 is disposed in the housing 71. The circuit unit 73 is well known to the skilled artisan, and need not be reiterated herein.

The stereoscopic display device 3 is disposed on the main body 7. More specifically, the housing 71 of the main body 7 has an accommodating slot 72. In the present embodiment, the accommodating slot 72 is located at a top surface of the housing 71, the stereoscopic display device 3 is disposed in the accommodating slot 72, and a surface of the stereoscopic display device 3 is exposed outside the housing 71. The configuration and function of the stereoscopic display device 3 of the present embodiment are the same as those of the first embodiment, and will not be reiterated herein. The game machine of the present embodiment includes the stereoscopic display device 3 that enables a user to see a stereo image at an oblique viewing angle. The stereoscopic display device 3 is integrated into an electronic product (i.e. a game machine) to enable the electronic product to have a stereo image display function.

Sixth Embodiment

Figure 8:
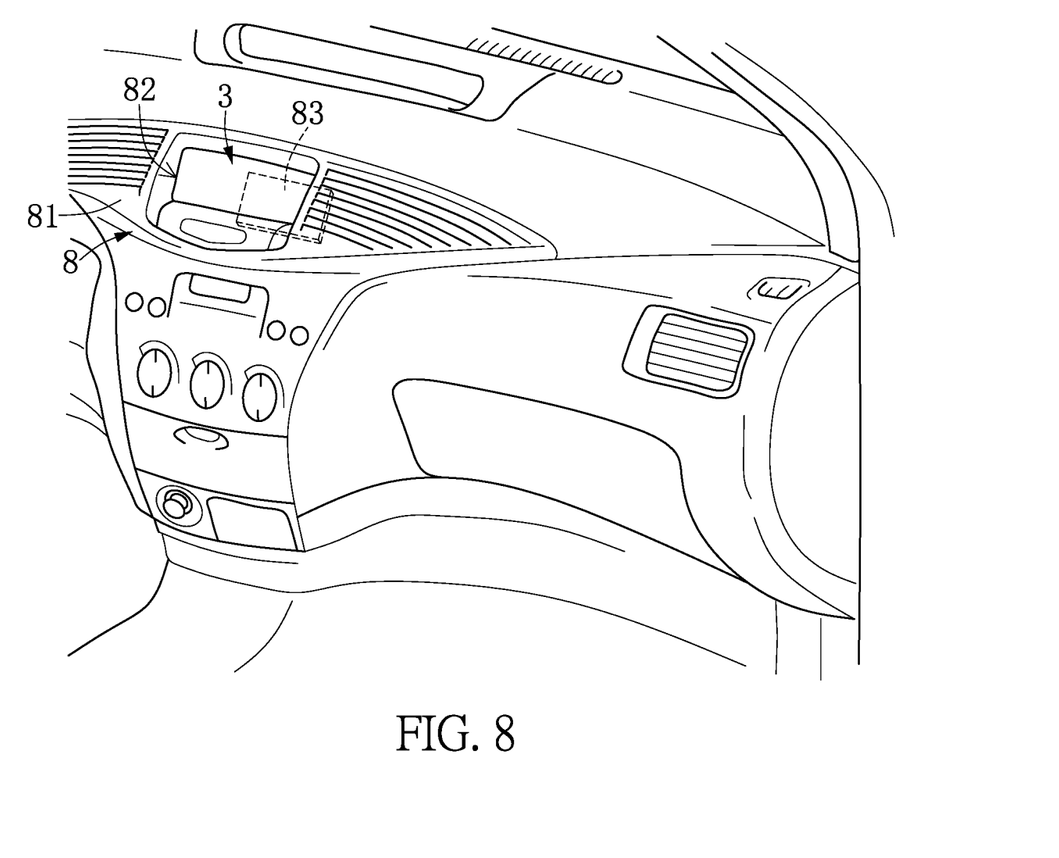
FIG. 8 is a perspective view showing an electronic product with a stereoscopic display device according to a sixth embodiment of the present disclosure.

Referring to FIG. 8, the electronic product of the present embodiment is a car dashboard of a smart car. The car dashboard includes a main body 8 and a stereoscopic display device 3. The main body 8 includes a housing 81 and a circuit unit 83. The circuit unit 83 is disposed in the housing 81. The circuit unit 83 is well known to the skilled artisan, and need not be reiterated herein.

The stereoscopic display device 3 is disposed on the main body 8. More specifically, the housing 81 of the main body 8 has an accommodating slot 82, the stereoscopic display device 3 is disposed in the accommodating slot 82, and a surface of the stereoscopic display device 3 is exposed outside the housing 81. The configuration and function of the stereoscopic display device 3 of the present embodiment are the same as those of the first embodiment, and will not be reiterated herein. The car dashboard of the present embodiment includes the stereoscopic display device 3 that enables a user to see a stereo image at an oblique viewing angle. The stereoscopic display device 3 is integrated into an electronic product (i.e. a car dashboard) to enable the electronic product to have a stereo image display function.

Seventh Embodiment

Figure 9:
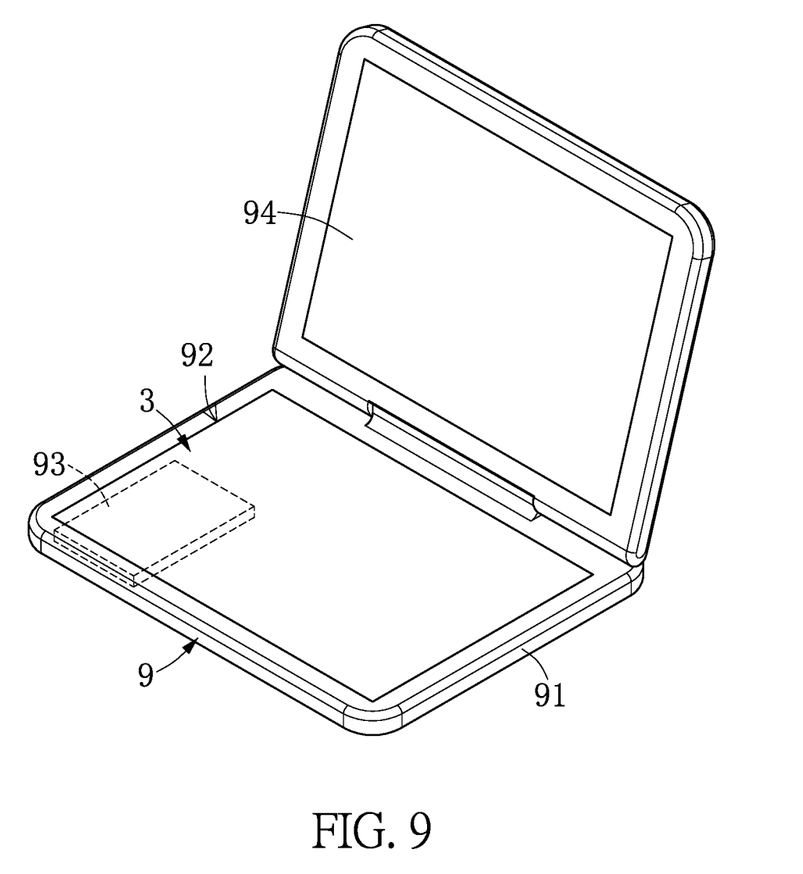
FIG. 9 is a perspective view showing an electronic product with a stereoscopic display device according to a seventh embodiment of the present disclosure.

Referring to FIG. 9, the electronic product of the present embodiment is an assembled digital signage. The assembled digital signage includes a main body 9 and a stereoscopic display device 3. The main body 9 includes a housing 91 and a circuit unit 93. The circuit unit 93 is disposed in the housing 91. The main body 9 is connected to a display 94. The circuit unit 93 is well known to the skilled artisan, and need not be reiterated herein.

The stereoscopic display device 3 is disposed on the main body 9. More specifically, the housing 91 of the main body 9 has an accommodating slot 92, the stereoscopic display device 3 is disposed in the accommodating slot 92, and a surface of the stereoscopic display device 3 is exposed outside the housing 91. The configuration and function of the stereoscopic display device 3 of the present embodiment are the same as those of the first embodiment, and will not be reiterated herein. The assembled digital signage of the present embodiment includes the stereoscopic display device 3 that enables a user to see a stereo image at an oblique viewing angle. The stereoscopic display device 3 is integrated into an electronic product (i.e. an assembled digital signage) to enable the electronic product to have a stereo image display function.

Eighth to Twelfth Embodiments

Figure 10:
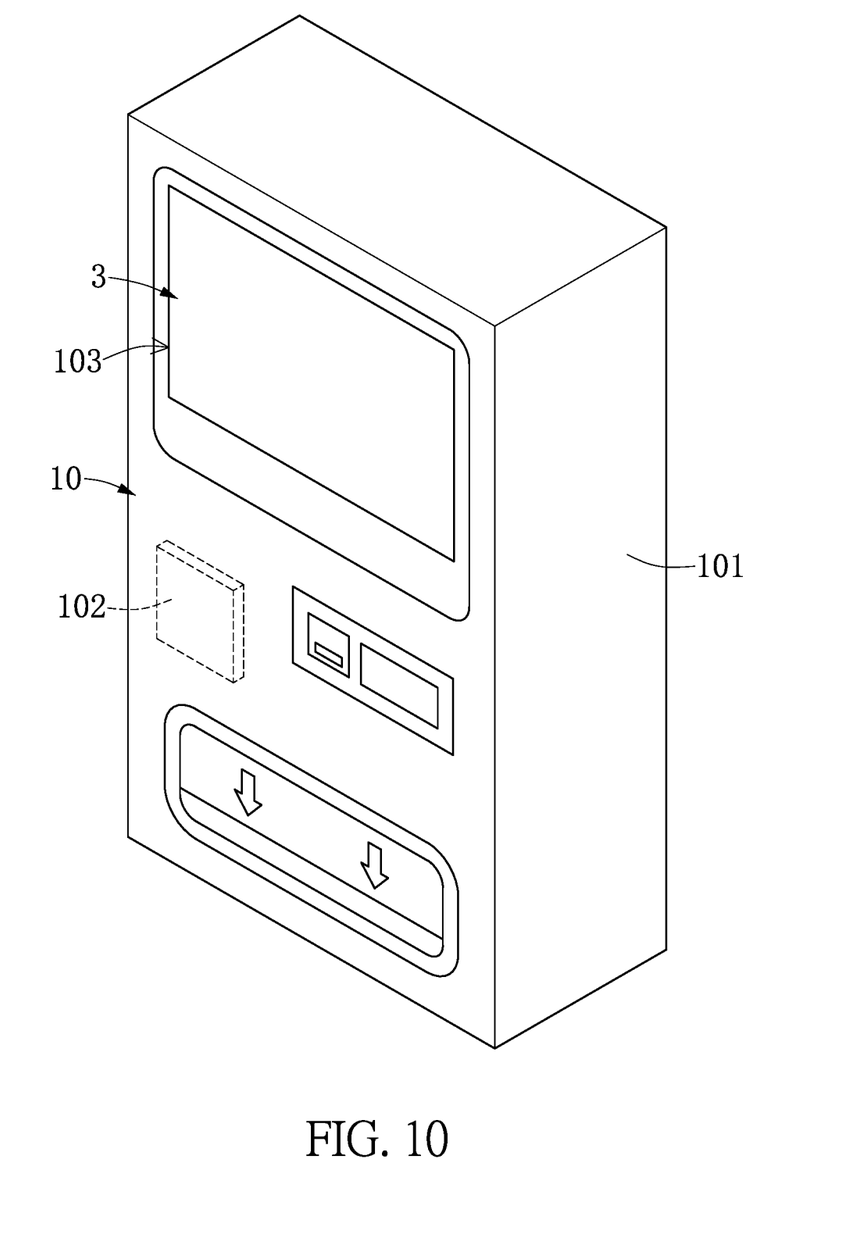
FIG. 10 is a perspective view showing an electronic product with a stereoscopic display device according to an eighth embodiment of the present disclosure.
Figure 11:
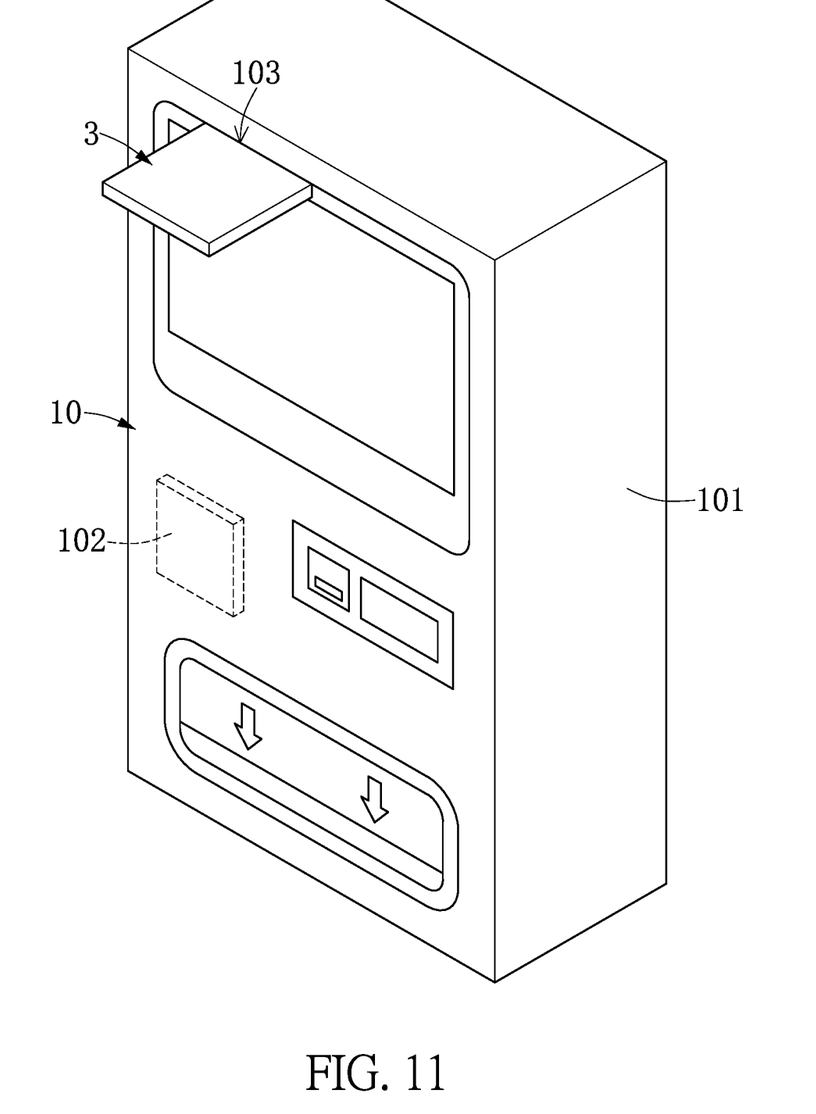
FIG. 11 is a perspective view showing an electronic product with a stereoscopic display device according to a ninth embodiment of the present disclosure.
Figure 12:
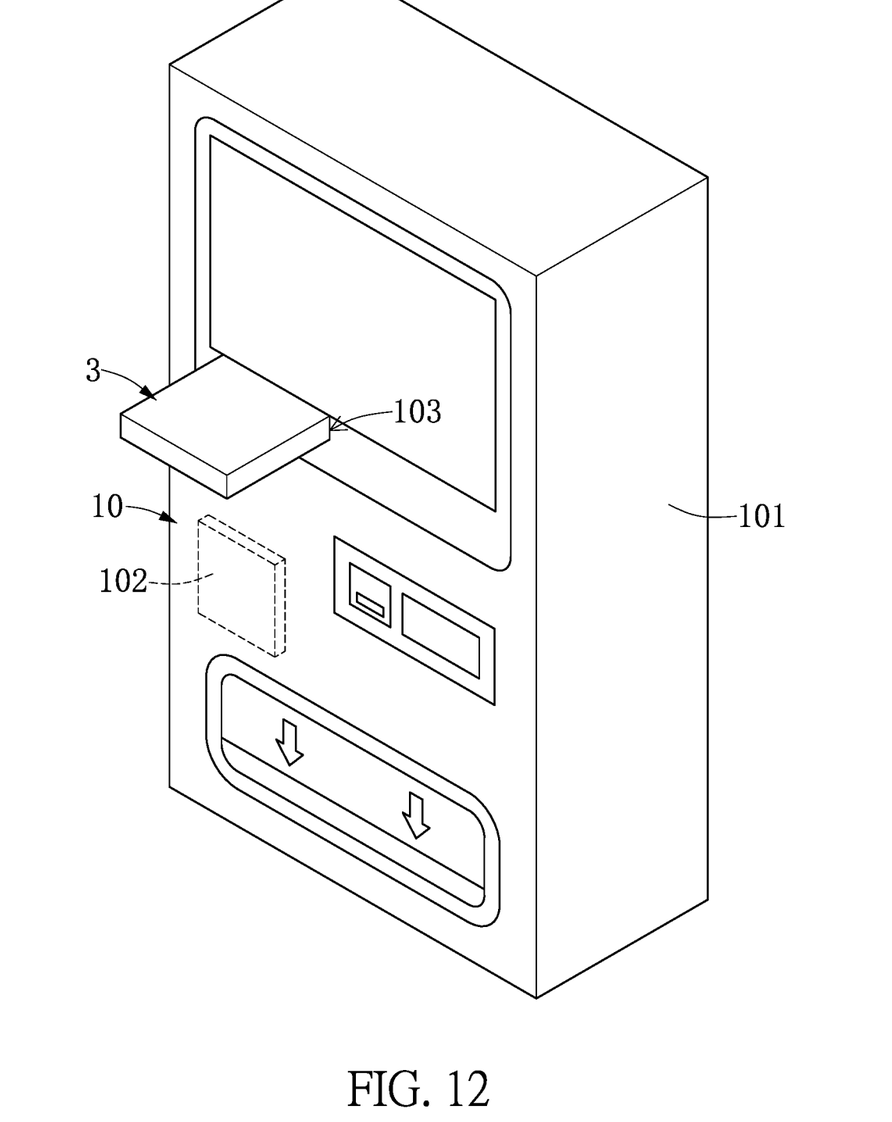
FIG. 12 is a perspective view showing an electronic product with a stereoscopic display device according to a tenth embodiment of the present disclosure.
Figure 13:
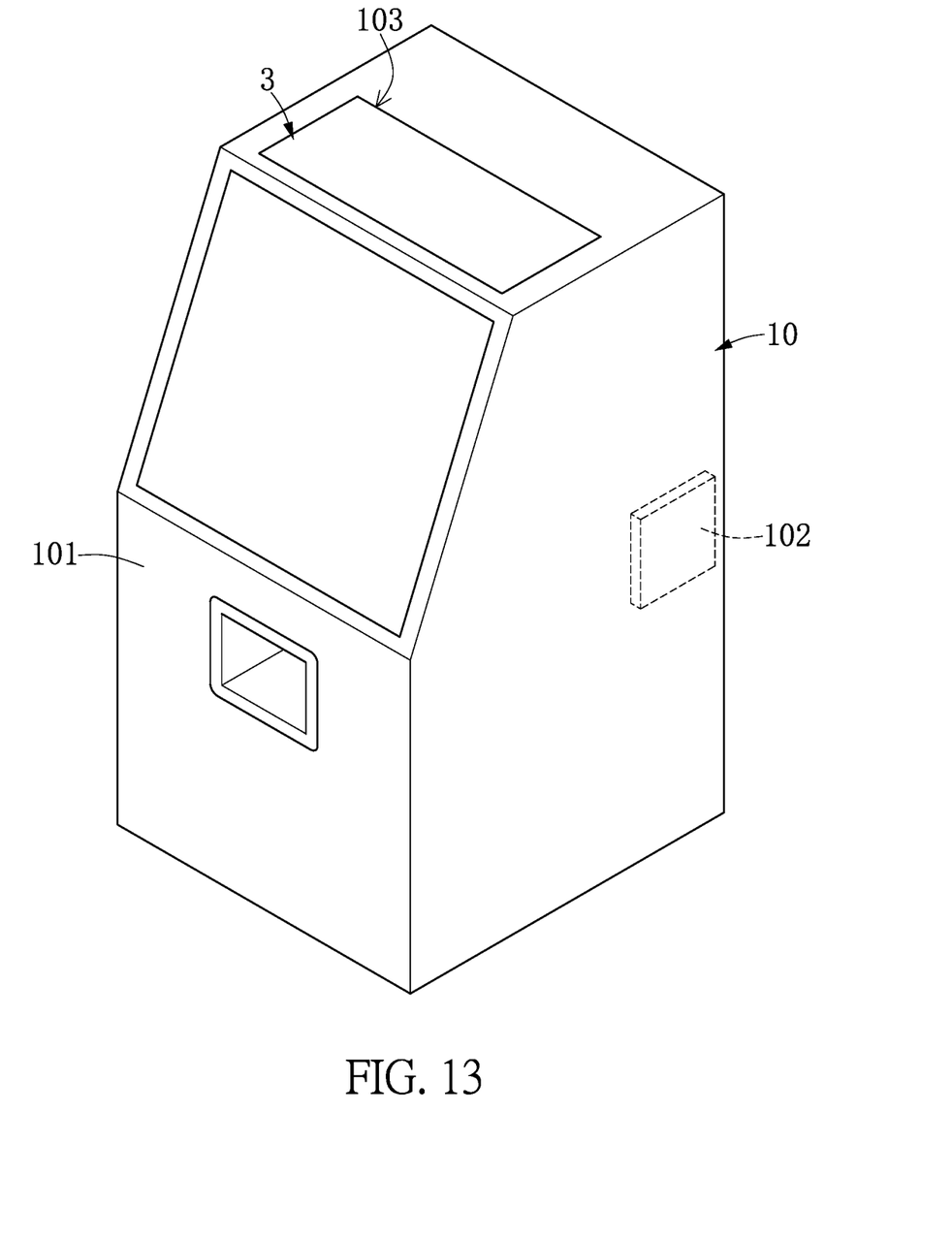
FIG. 13 is a perspective view showing an electronic product with a stereoscopic display device according to an eleventh embodiment of the present disclosure.
Figure 14:
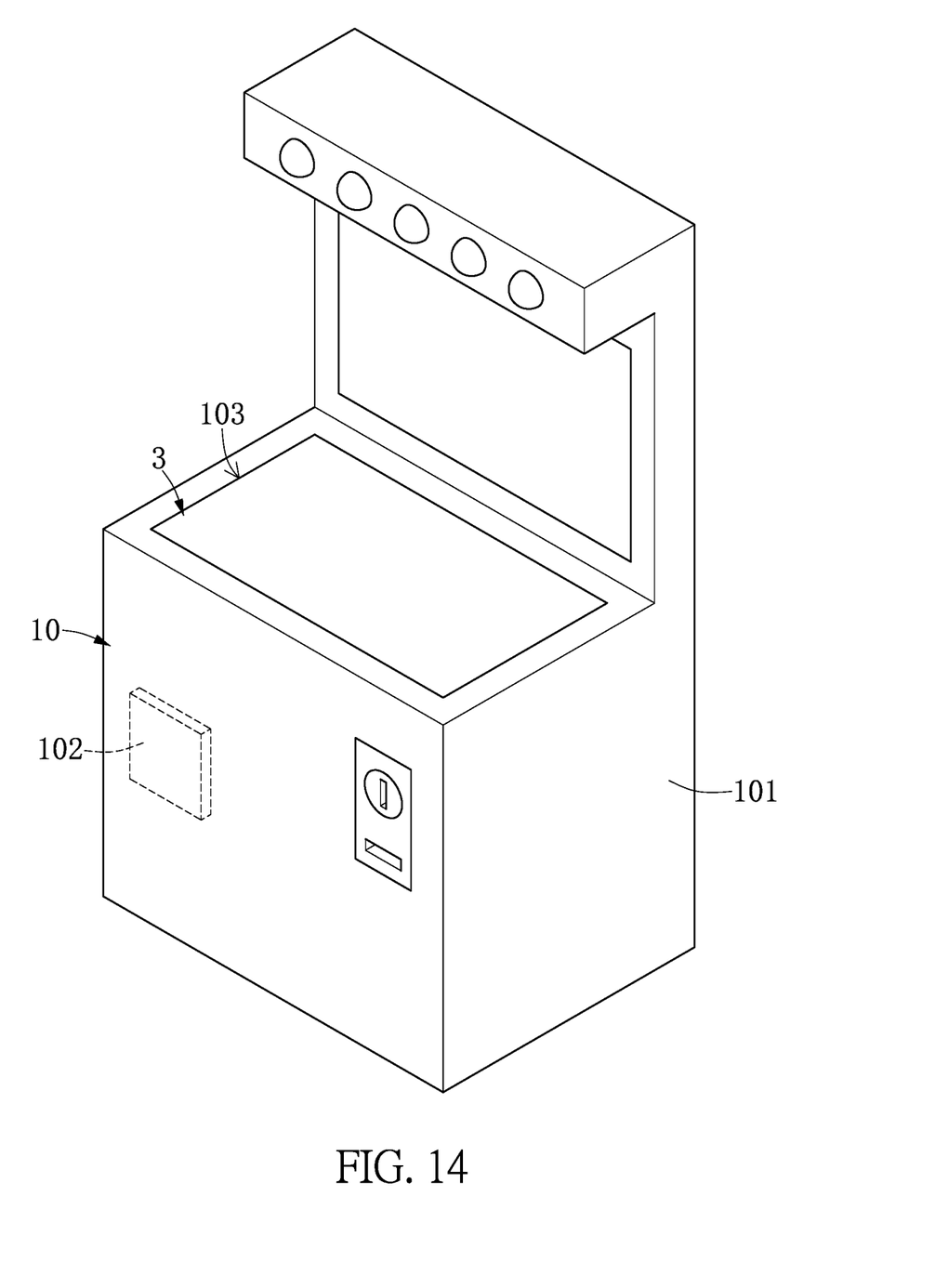
FIG. 14 is a perspective view showing an electronic product with a stereoscopic display device according to a twelfth embodiment of the present disclosure.

Referring to FIG. 10 to FIG. 14, the electronic product of the present embodiment may be a vending machine (as shown in FIG. 10 to FIG. 12), an automatic ticket vending machine (as shown in FIG. 13) or a commercial game machine (as shown in FIG. 14). The above electronic products each include a main body 10, and the main body 10 includes a housing 101 and a circuit unit 102 disposed in the housing 101. The configurations of the vending machine, the automatic ticket vending machine and the commercial game machine are well known to the skilled artisan, and need not be reiterated herein. The housing 101 of the main body 10 has an accommodating slot 103, and the stereoscopic display device 3 is disposed in the accommodating slot 103 of the main body 10. The above electronic products of the present embodiment each include the stereoscopic display device 3 that enables a user to see a stereo image at an oblique viewing angle. The stereoscopic display device 3 is integrated into an electronic product (i.e. a vending machine, an automatic ticket vending machine or a commercial game machine) to enable the electronic product to have a stereo image display function.

In conclusion, the advantage of the present disclosure is that since a stereoscopic display device is integrated into an electronic product, the electronic product not only has its own function, but also has a stereo image display function. The stereoscopic display device of the present disclosure changes a frontal viewing angle of a conventional naked-eye 3D stereoscopic display device into an oblique viewing angle, and enables a user to see a stereo image at the oblique viewing angle. Moreover, the stereo image is displayed above or in front of the stereoscopic display device so as to generate an effect that the stereo image is floating in mid-air.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electronic product with a stereoscopic display device, comprising:
   a main body including a housing and a circuit unit; wherein the circuit unit is disposed in the housing, and the housing has an accommodating slot; and
   a stereoscopic display device disposed in the accommodating slot of the main body;
   wherein the stereoscopic display device includes a flat panel display, a lens array layer and a microstructure layer, the flat panel display has a display surface, the flat panel display, the lens array layer, and the microstructure included by the stereoscopic display device are undetachably disposed in the accommodating slot, a bottom surface of the flat panel display away from the display surface is not exposed from the main body, the lens array layer is disposed on the display surface of the flat panel display, the lens array layer includes a plurality of lenses, the lens array layer is configured to adjust light field, the microstructure layer is disposed on the lens array layer, the microstructure layer includes a plurality of microstructures, the microstructure layer is configured to modulate a direction of light, and the stereoscopic display device is configured to display a stereo image that is floating in mid-air.

2. The electronic product with the stereoscopic display device according to claim 1, wherein a surface of the stereoscopic display device exposed outside the housing is flush with the housing.

3. The electronic product with the stereoscopic display device according to claim 1, wherein a surface of the stereoscopic display device exposed outside the housing protrudes from the housing or is recessed in the housing.

4. The electronic product with the stereoscopic display device according to claim 1, wherein two opposite sides of the stereoscopic display device respectively abuts against two opposite inner walls of the accommodating slot.

5. The electronic product with the stereoscopic display device according to claim 1, wherein each lens conforms to the Lensmaker's equation: $1/f=(n-1)(1/R1+1/R2)$, wherein R1 and R2 are respective curvature radiuses of two opposite surfaces of the lens, f is a focal length of the lens, and n is a refractive index of the lens.

6. The electronic product with the stereoscopic display device according to claim 1, wherein the electronic product is a portable electronic product.

7. The electronic product with the stereoscopic display device according to claim 1, wherein the electronic product is a notebook computer, a smart speaker, a digital signage, a mobile phone, a game machine, a car dashboard of a smart car, a commercial game machine, a vending machine or an automatic ticket vending machine.

* * * * *